Dec. 11, 1934.  A. S. DIACK  1,984,179

VEHICLE DRIVING MEANS

Filed July 24, 1933

INVENTOR.
Alexander S. Diack
BY Swan, Frye & Hardesty
ATTORNEYS

Patented Dec. 11, 1934

1,984,179

UNITED STATES PATENT OFFICE 1,984,179

VEHICLE DRIVING MEANS

Alexander S. Diack, Detroit, Mich.

Application July 24, 1933, Serial No. 681,905

6 Claims. (Cl. 74—314)

This invention relates to driving and differential constructions for automotive vehicles, and is more particularly directed to the provision of novel, extremely simple, and compact driving means for imparting to the propelling wheels a steady driving force without tending to cause bouncing or vertical vibration thereof. Although here shown applied to a particular rear axle mechanism arranged in a manner now regarded as more or less conventional, it will readily be appreciated that the invention is equally applicable to other and less conventional designs and utilizable in conjunction with either front or rear drive self-propelling vehicles of virtually any sort.

An important object of the invention is the provision of such a differential construction which eliminates the tendency of the driving wheels of an automotive vehicle to bounce vertically in the rythmic, vibratory manner which is well known and has long been regarded as objectionable in the art, but the causes of and remedies of which have remained unknown.

Another important object lies in the provision of such a construction conforming as closely as possible to the axle and differential arrangement now regarded as conventional, which is extremely simple and adds very little if anything to the cost of these parts, which enables the use of bevel gear drive, occupies no more room than differentials of the sort now in use, and imparts a much steadier driving force to the rear axle than previously used bevel gear driving arrangements, and which has no tendency to vibrate the axle and wheel assembly vertically.

Another important object is the provision of novel and effective means for lubricating such an improved differential construction.

A still further object is the provision of a differential arrangement possessing the aforementioned advantages, utilizing but a single additional gear, and which does not increase the vertical dimensions of the differential housing, or otherwise affect the road clearance of the vehicle.

Further objects are the more economical and efficient application of power to the driving wheels, the bettering of traction and reduction of tire wear, the reduction of wear of springs, shackles and the like, and the conservation of fuel and oil, all by preventing wastage of power and bouncing and spinning of the wheels.

Still another object is the provision of driving means which greatly reduces the wear on roads, and eliminates the tendency of the driving wheels to form ripples or wave-like irregularities in dirt or gravel roads.

Other objects and advantages will be apparent from the following description, wherein reference is made to the accompanying drawing illustrating a preferred embodiment of my invention, and wherein similar reference numerals designate similar parts throughout the several views.

In the drawing:

Figure 1 is a sectional view of a rear axle of conventional construction, not incorporating the invention, showing a fragment of the propeller shaft, the differential, and one rear wheel, and constituting a diagrammatic representation adapted to assist in bringing out the causes of the vertical rear wheel vibration or "bouncing" noticeable in present day automobiles equipped with driving means of this sort;

Figure 1:
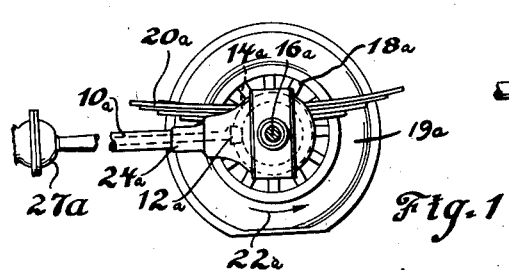

Referring now to the drawing, and more particularly first to the conventional driving arrangement illustrated in Figure 1, it will be observed that the propeller shaft $10a$ is shown as adapted to drive, through a pinion $12a$, a ring gear $14a$, which is coupled through suitable differential mechanism unknown to the axle shafts, one only of which is shown, designated $16a$. The axle spindles in turn drive the wheels as $18a$. The entire rear axle and wheel assembly is attached to suitable springs $20a$, rendering the assembly yieldably movable relatively to the vehicle itself (not shown). It will be seen that the normal path of springing movement of the wheel and axle assembly is almost a vertical one, while the pinion $12a$ applies power to the ring gear $14a$ at a point lying on a horizontal plane running through the axis of the axle spindles. By virtue of the resiliency of the tires $19a$ with which the wheels $18a$ are provided, and of the springs $20a$, the wheel and axle assembly may be considered as yieldably suspended between balanced forces, being movable vertically both upward and downward against the resiliency of the springs and tires.

By virtue of the aforementioned positioning of the point of application of the power transmitted by pinion $12a$ in such conventional constructions, each application of torque to pinion $12a$ not only tends to turn the ring gear and wheels in the direction indicated by the arrow 22a, but also tends to depress the entire wheel and axle assembly upon each power application or impulse. This tendency of the driving pinion to impart vertical movement to the axle housing and wheel assembly may be due to the horizontal spacing of the driving pinion 12a and the bearing 24a, so that by reason of the spaced points at which the downward force exerted by the pinion on the ring gear and the opposed upward thrust of the propeller shaft on the bearing are applied, each driving impulse tends to oscillate the axle housing vertically substantially about the centers of the universal joints, as 27a in the propeller shaft. Whether or not this is the proper explanation of the phenomenon, however, it is a well-known fact that the power impulses do tend to oscillate the wheel and axle assembly vertically, alternately compressing the tires and allowing the springs to descend below center, and vice versa. As is also well known, explosion engines such as are ordinarily used for driving automotive vehicles apply power in separate impulses which are spaced but regular in time.

It will be appreciated that by reason of the mass of the wheel and axle assembly, and its resilient suspension in the manner described, this assembly will possess a natural period or frequency of vertical oscillation. This is also true of the gross load carried by the springs. When the engine speed is such that the (natural or harmonic) frequency of application of power impulses through the pinion 12a is in tune or "step" with such natural frequency of oscillation of the assembly, or of the load, or both, or perhaps with a harmonic frequency of either, any appropriately positioned bumps or irregularities in a road over which the vehicle is passing tend to reinforce such wheel and axle bouncing, and create oscillations of substantial amplitude, being reinforced by the power impulses, and if these also are in step with the natural period of vertical vibration, all of these forces will tend to sustain and increase the oscillation. Such bouncing may also be started and maintained entirely by the resonance of these frequencies, independently of road conditions, although it is then ordinarily of lesser amplitude. When irregularities in the road are present, however, the wheels frequently bounce violently, and continue to do so as long as the forces are in tune and the oscillation is not upset either by a change of engine speed or by reason of the wheel striking an irregular portion of the road which happens to be appropriately positioned to dampen rather than reinforce the oscillation. This tendency of the wheels and axle to bounce vertically whenever the forces mentioned get in step and the formation of the road is favorable, causes the rear wheel bounce so commonly noticed on dirt, gravel and other impressionable roads, and produces the ripple marks or "corduroy" surface on the roads themselves by the digging effect of the tires as they strike the road, spinning, after being bounced clear thereof.

In order to avoid this difficulty I propose to so construct the driving gear and differential portions of the rear axle that the power impulses of the engine have no tendency to induce vertical vibration of the axle housing, and the wheels are thus free to follow the configuration of the road without disturbance of their movement in any such manner as that just discussed. Similar benefits may have incidentally been attained in the past, though to a lesser degree and without realization of cause and effect, in worm gear driving assemblies in which the power has been applied to either the top or bottom of a differential ring worm wheel, so that a major portion of the reactive thrust imposed upon the bearing through which the propeller shaft extends is horizontal, and creates virtually no vertical forces, but such elimination of the aforementioned difficulties has never been attained, insofar as I am aware, in a practical bevel gear construction.

Figure 2:
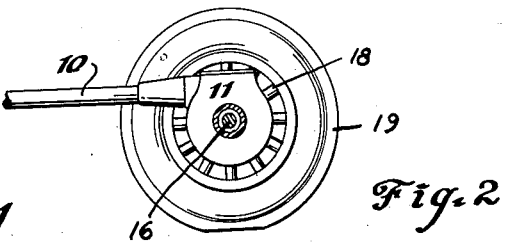
Figure 2 is a similar view showing a rear axle embodying the invention.
Figure 3:
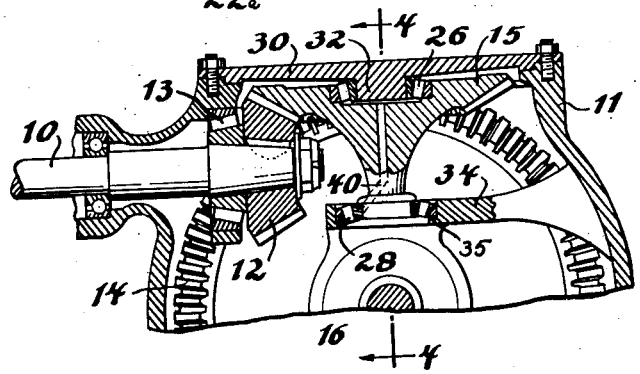
Figure 3 is a detail transverse section of such a differential.
Figure 4:
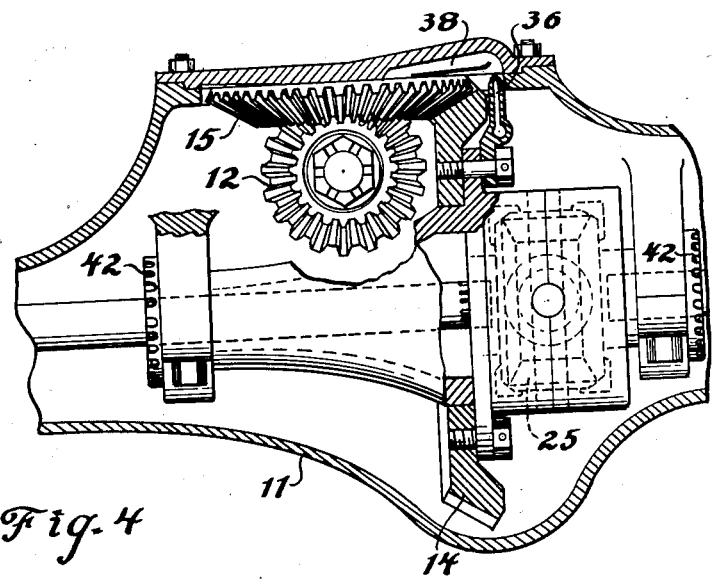
Figure 4 is a section taken substantially on the line 4—4 of Figure 3 and looking in the direction of the arrows.

In the embodiment shown in Figures 2 to 4 inclusive, conventional spur or spiral bevel gears are used in an economical arrangement which not only completely eliminates all tendency toward sustained rear wheel bouncing but consumes no added road clearance or other needed space. The driving gear 12 is fixedly carried by the propeller shaft 10, which extends into the differential housing 11 through suitable anti-friction bearings as 13. As shown in the drawing, the propeller shaft enters the housing near the top, and the pinion 12, rather than directly driving the ring gear 14, drives an idler 15, which in turn drives the ring gear, and is arranged to apply power thereto at the top of the ring gear, that is, at a point lying substantially on a vertical line dropped through the axis of the axle shafts.

As shown in Figure 4, the planetary differential gears, designated 25, are carried by the rear face of the ring gear 14, so that the pinion 12 and idler 15 may project into the space in front of the ring gear. The idler 15 may be mounted in vertically aligned bearings as 26—28, shown as of the anti-friction variety, one carried by the cover plate 30 of the casing 11, which is provided with an integral downwardly projecting stub shaft 32 for positioning the bearing 26, and the other (28) by a bracket 34 carried by and projecting from the rear wall of the casing.

To assist in lubricating the bearings 26—28, and the gears, splashing devices or small bucket members as 36 may be provided, carried by the rear face of the ring gear and adapted to carry or lift oil from the lower portion of the housing, and throw it into an oil channel as 38 arranged to conduct oil to the bearing 26. One or more oil passages as 40 may extend vertically through the hub of gear 15 to permit oil to flow from the bearing 26 to bearing 28. The axle spindles may be mounted in suitable bearings as 42 within the housing, of the conventional or any desired construction.

It will be understood that the arrangement might be considerably modified without destroying its essential features and functioning. Both the driving pinion and idler, for example, might be arranged at the bottom of the housing and adapted to apply power to the ring gear at the bottom, though in similar vertical alignment with the axle spindle, and the operation, as will be readily apparent, would be substantialy identical.

The idler arrangement and other changes incorporated in the improvement are not only so simple and economical as to add virtually nothing to the expense of construction, but it will be seen that the idler gear is readily accessible for inspection, replacement or adjustment by simply removing the cover plate. Compensation for wear may also easily be made by virtue of the provision of shims or the like, as 35, beneath the lower bearing 28. Not only is but a single idler used, but it will be seen that neither it nor any portion of the mechanism projects beyond the maximum diameter of the ring gear, so that no additional needed space whatever is occupied by the improvement, and road clearance is accordingly unaffected.

While it will be apparent that the illustrated embodiment of my invention disclosed herein is well calculated to adequately fulfill the objects and advantages primarily stated, it is to be understood that the invention is susceptible to variation, modification and change within the spirit and scope of the subjoined claims.

What I claim is:

1. A combined driving and differential construction for automotive vehicles, comprising a resiliently mounted axle casing, driving wheels rotatably carried at its ends by the axle casing, axle spindles for the wheels journaled in the casing, a differential housing portion carried by the casing intermediate its ends and into which the spindles project, a differential mechanism within said housing portion and connected to the shafts and means for driving the differential means including a bevel ring gear journaled on a substantially horizontal axis coincident with the axle spindles, an idler arranged in front of the ring gear and meshing therewith at a point lying on a vertical line extending perpendicularly thru the extended axis of the ring gear, and a driving pinion also arranged partially in front of the ring gear and meshing with said idler.

2. Combined driving and differential means for vehicles comprising a resiliently mounted axle casing incorporating a differential housing portion, a bevel ring gear journaled on a substantially horizontal axis in said housing portion, the housing portion being only slightly greater in vertical dimension than the ring gear diameter, an idler journaled on a vertical axis perpendicular to the extended axis of the ring gear and meshing with said gear, a drive shaft extending into said housing portion, and a driving pinion carried thereby and meshing with the idler and arranged closer to the ring gear axis than said idler.

3. Combined driving and differential means for an automotive vehicle comprising a resiliently mounted axle casing incorporating a differential housing portion, a bevel ring gear journaled on a substantially horizontal axis, in said housing portion, the housing portion being only slightly greater in vertical dimension than the diameter of the ring gear, and having a rigid but removable cap portion, an idler journaled on a vertical axis perpendicular to the extended axis of the ring gear, and meshing with said gear, one bearing of said idler being carried by said cap, a drive shaft extending into said housing portion, and a driving pinion carried by said shaft and meshing with the idler.

4. A driving axle and differential construction comprising a resiliently mounted axle casing incorporating a differential housing portion, a bevel ring gear journaled on a substantially horizontal axis in said housing portion and of such diameter as to substantially consume the interior height of said housing, an idler gear in said housing portion and in front of and meshing with the idler and arranged on a vertical axis perpendicular to the extended axis of the ring gear, a rigid cap for the housing portion, a bearing portion for the idler carried by said cap, another bearing portion carried by a wall of the housing portion and projecting thereinto across the face of the ring gear, a drive shaft projecting into the housing portion, and a driving pinion carried thereby and meshing with the idler and also extending in front of the ring gear.

5. In a device of the character described, a unitary yieldably supported casing, axle spindles journaled therein terminating in abutting relation, differential gearing between said abutting spindle ends, driving means including a bevel ring gear within the casing, an idler meshing with said ring gear and also journaled entirely within said casing, a drive spindle projecting into and journaled in said casing and partly across the face of said ring gear, a driving gear carried by said driving shaft within said casing and meshing with the idler, the axle and drive spindles being arranged in different planes.

6. In a device of the character described, a unitary yieldably supported casing, axle spindles journaled therein terminating in abutting relation, differential gearing between said abutting spindle ends, driving means including a bevel ring gear within the casing, an idler meshing with said ring gear and also journaled entirely within said casing, a drive spindle projecting into and journaled in said casing and partly across the face of said ring gear, a driving gear carried by said driving shaft within said casing and meshing with the idler, each of said journaled elements having its axis lying in a different plane.

ALEXANDER S. DIACK.